United States Patent [19]

Lenear et al.

[11] Patent Number: 5,624,307
[45] Date of Patent: Apr. 29, 1997

[54] METHOD FOR REDUCING FECAL LEAKAGE AND CONTAMINATION DURING MEAT PROCESSING

[75] Inventors: Ted Lenear, Chicago, Ill.; Jim C. Stockam, Carthage, Mo.

[73] Assignee: Swift-Eckrich, Inc., Downers Grove, Ill.

[21] Appl. No.: 440,825

[22] Filed: May 15, 1995

[51] Int. Cl.$^6$ .................................................. A22C 21/00
[52] U.S. Cl. ........................................................ 452/176
[58] Field of Search .................................. 452/176, 109, 452/120; 128/401, DIG. 25

[56] References Cited

U.S. PATENT DOCUMENTS

| | | | |
|---|---|---|---|
| 3,881,485 | 5/1975 | Davis, Jr. | 128/270 |
| 4,209,009 | 6/1980 | Hennig | 128/283 |
| 4,258,704 | 3/1981 | Hill | 128/1 R |
| 4,739,539 | 4/1988 | Simmons | 452/119 |
| 4,899,421 | 2/1990 | Van Der Eerden | 452/119 |
| 5,083,975 | 1/1992 | Neal et al. | 452/176 |
| 5,114,380 | 5/1992 | Larsen | 452/176 |
| 5,120,266 | 6/1992 | Aubert | 452/176 |
| 5,120,267 | 6/1992 | Neal et al. | 452/176 |
| 5,292,278 | 3/1994 | Neal et al. | 452/176 |
| 5,453,044 | 9/1995 | Abler et al. | 452/176 |

OTHER PUBLICATIONS

Mulder, Dr. R. W. A., "Decrease Microbial Contamination During Poultry Processing", Poultry—Misset, Mar. '85, pp. 52–55.

*Primary Examiner*—Willis Little
*Attorney, Agent, or Firm*—Pretty, Schroeder & Poplawski

[57] ABSTRACT

Disclosed is a method for processing live animals into meat food products involving slaughtering the animal, inserting a tampon-like plug into the rectum of the slaughtered animal to obstruct the rectum and substantially reduce fecal leakage past the plug, and then eviscerating the animal. The method can be integrated into conventional semi-automatic processes for processing a live animal in order to substantially reduce fecal leakage and contamination.

18 Claims, No Drawings

METHOD FOR REDUCING FECAL LEAKAGE AND CONTAMINATION DURING MEAT PROCESSING

BACKGROUND OF THE INVENTION

1. Field of the Invention

The present invention relates to the field of animal processing to provide meat food products. More specifically, it relates to methods for reducing leakage of and contamination by matter form the rectum vent of an animal by obstructing the rectum vent.

2. Discussion of the Related Art

Public attention has recently been focused on the microbiological safety of commercially processed meat. Although this country's meat supply has remained consistently safe for many years, with a low incidence of microbial contamination causing illness, governmental agencies responsible for regulation and on-site inspection of commercial meat processing appear to be moving towards a policy of zero tolerance for microbial contamination. Accordingly, sources of contamination, including sources of food-borne pathogens and food-spoilage microbes, and the effects of current processing on contamination have come under scrutiny.

Generally, the origin of microbial contamination in raw meat, such as raw poultry, is the live animal; not the processing facility. The number of microbes found in a retail product is heavily influenced by the microbiological condition of the live animal, which is usually reared in close proximity with many of its kind, making transmission of potentially pathogenic and spoilage microorganisms possible.

The fecal micro flora of animals for slaughter is by far the predominant source of zoonotic microbes such as Campylobacter and Salmonella. Therefore, it is a desideratum for an effective method for reducing gross fecal leakage and contamination during processing.

Modern commercial animal processing generally is a multi-step process employing semi-automated apparatus for transporting an animal sequentially through different, and preferably, physically isolated processing stations to minimize contamination from human sources and cross-contamination between stations. For example, after arriving at a processing plant, poultry are hung by their feet, stunned and then transported through a number of work stations ending with a cleaned carcass being cut into parts suitable for cooking or with the entire carcass being preserved for cooking.

More particularly, in a modern, automated, commercial processing plant, poultry is conveyed through a plurality of consecutive work stations or areas. Typically, the work stations include a slaughtering station where the throat of an invertedly suspended bird is cut and blood is permitted to drain; a scalding station, where the carcass is submerged in heated water to facilitate de-feathering; a de-feathering station, where spinning rubber fingers impact the outside of the carcass to remove the feathers; a washing station, where the exterior of the bird is washed by spraying with an unheated aqueous solution; a hock-cutting station where the feet are removed; and an evisceration station where the internal organs are removed from the remainder of the carcass.

Various measures have been put into place to avoid contamination and cross-contamination of meats during processing and to eliminate microbes introduced by the live animal. However, microbe-free meats have not yet been achieved, a long standing problem being the contamination and cross-contamination of poultry and other meats by the leakage of fecal materials from the rectum vent of the animal during processing.

For example, the de-feathering step can be a major source of contamination of poultry carcasses. As the spinning rubber fingers move from one carcass to another, they may spread fecal material leaked from a few carcasses to many carcasses.

Another step that can be a major source of contamination is evisceration. During evisceration the digestive tract organs are sometimes cut or otherwise opened so that ingesta or fecal material or other contents of the intestine may be released.

One approach to the problem of fecal leakage is to remove fecal matter from the animal to be processed. For example, one method involves squeezing or kneading the large intestine and rectum or cloaca of a poultry animal to force any fecal material out from the poultry animal. This is usually done manually and cannot effectively be accomplished at a rate which is compatible with the desired rates of operation of the conveyors in modern poultry processing facilities.

Another example of this approach involves using a suction probe inserted into the vent of the poultry animal. Loose fecal matter within the vent is supposedly withdrawn by the suction applied to the probe. Suction probes have not been particularly satisfactory, however. The probes often cannot remove all the loose fecal material due to the absence of air within the vent to create an air flow for entraining the fecal matter into the suction probe. Efforts to overcome this problem by increasing the amount of suction can actually work to suck out part of the intestine itself, thereby, damaging the poultry animal often causing fecal leakage instead of preventing it.

Another approach to the problem involves obstructing the opening of the rectum vent. For example, one method includes gluing the vent opening shut. Fecal matter within the vent is supposedly prevented from leaking out through the vent by the adhesive seal. Adhesives have not been particularly satisfactory, due to leakage resulting from, for example, incomplete seals, tearing of the vent opening or adjacent area of the intestine during processing of the carcass.

Another example of this second approach involves inserting neoprene balls into the rectum vent to supposedly block intestinal fluids from leaking. However, such balls have demonstrated themselves to be nonstationary during the subsequent processing of the carcasses. This has resulted in fecal leakage, contamination and cross-contamination of carcasses.

Still another example of this approach is taken with relatively large animals such as cows, pigs, and sheep. A circular cut generally circumscribing the vent opening is made in the carcass and the entire circumscribed vent area is pulled out, pulling a portion of the intestine through the vent cut. The dislodged intestine immediately adjacent the anus or vent opening tied with a string or other clamping means to prevent intestinal leakage during further process steps. One drawback to this approach is that it is only useful with relatively large carcasses. A second drawback is that, even when it is used, it is labor-intensive and not compatible with the desired rates of operation of conveyors used in semi-automated processing facilities.

Therefore, it is a desideratum for a method for reducing fecal leakage and contamination that can simply and effectively be incorporated into the conventional semi-automated processing of slaughtered animals into meat food products. It is also a desideratum for a method that does not preliminarily require the removal or suction of fecal matter from the rectum or the tying of the intestine of the animals to be processed.

Thus, there remains a definite need for an effective method for reducing gross fecal leakage and contamination. There remains a further definite need for methods which may be integrated into modern meat processing facilities to provide reliable, safe and consistent prevention of fecal leakage and contamination. The present invention satisfies these and other needs and provides further related advantages.

SUMMARY OF THE INVENTION

Now, in accordance with the invention, there has been found a method that can be integrated into conventional, semi-automated processes for processing a live animal in order to substantially reduce fecal leakage and contamination. The method involves slaughtering the animal, inserting a tampon-like plug into the rectum of the slaughtered animal to obstruct the rectum and substantially reduce fecal leakage past the plug, and then eviscerating the animal. The method is useful in the processing of cows, pigs, sheep and poultry, such as chickens, game hens, ostriches, ducks and turkeys. The tampon-like plug is preferably inserted early during processing and, when the animal is a poultry animal, it is most preferably inserted before the poultry carcass is scalded and de-feathered.

In a preferred embodiment, the process involves slaughtering a poultry animal, inserting a tampon-like plug into the rectum of the slaughtered animal, to position the distal end of the plug from about 4 cm to about 6 cm from the rectum vent. The plug is then caused to come into contact with the intestinal fluids, so that the plug swells and obstructs the rectum, thereby substantially preventing fecal leakage past the plug. Next the carcass is scalded, de-feathered, and then eviscerated.

Further, there has been found a pre-eviscerated animal carcass having a tampon-like plug inserted in its rectum to form an obstruction, thereby, substantially preventing fecal leakage. Still further, there has been found a semi-automated apparatus for processing a live poultry animal, the apparatus having a slaughtering station for providing a slaughtered carcass, a plug insertion station for inserting a tampon-like plug into the rectum of the slaughtered carcass, a scalding station for submerging the carcass in heated water, a de-feathering station for removing feathers from the carcass, and an evisceration station for removing the internal organs from the carcass.

DETAILED DESCRIPTION OF THE PREFERRED EMBODIMENTS

The following description may concentrate primarily on the processing of poultry, such as chickens and turkeys, into meat food products to exemplify a multi-step processing operation. It should be readily apparent to the skilled artisan that the description with little or no modification might also apply to processing of other animals, including those animals which are sources for other meat food products such as, for example, beef, pork, lamb, veal and the like.

The method in accordance of the invention is useful during the processing of any animal having a rectum or cloaca and a vent. Representative animals include cows, pigs, sheep and poultry, such as chickens, game hens, ostriches, ducks, and turkeys. The method has been found particularly effective in substantially reducing fecal leakage and contamination from poultry.

In accordance with the inventive method, a tampon-like plug is inserted through an animal's rectum vent and into its rectum. The plug is made from any natural or synthetic material that is compressible, i.e., can be squeezed through the rectum vent; is absorbent, i.e., absorbs the intestinal fluids found in the environment of the rectum; and is swellable and resilient, i.e., after insertion expands to conform to and create a seal with the mucosal surface of the rectal wall and then maintain the seal. Additionally, the material is sufficiently abrasive, so that once the plug is in place, it is not dislodged during the subsequent processing of the animal. Suitable materials are known in the art and include the materials useful for making conventional tampons, such as cotton, rayon and cellulose.

In some embodiments, the material is chosen because it acts as a microfilter to substantially prevent matter having a particle size as small as about 1μ from passing from the intestine through the plug. Also in some embodiments, the material is chosen because it is readily disposable, for example, by biodegradation or by rendering.

The plug is of any shape at least a portion of which has a substantially circular cross section. Representative shapes include cylinders, spheres, cones and frustrums, with cylinders being preferred. The specific dimensions will depend on the particular animal to be processed and will be readily determinable by one skilled in the art.

It is an advantage of the method in accordance with the invention that the insertion step is readily incorporated into conventional, semi-automated processing lines. The plug is manually inserted at an insertion station using a rounded, plastic tampon dispenser. It is advantageously inserted any time after the animal has been slaughtered or stunned and before it is eviscerated. To minimize fecal leakage and contamination, the plug is preferably inserted during one of the initial processing steps. When processing poultry, the plug is most preferably inserted after stunning and bleeding, but before the animals has been scalded. It is a benefit of the method in accordance with the invention that fecal leakage and contamination can be substantially reduced or eliminated without having to vacuum or suction the rectum or tie the intestine.

The depth of insertion of the plug into the rectum of a particular animals is dependent on the animal to be processed and will be readily determinable by one skilled in the art. With turkey, for example, the plug is preferably inserted so that the distal end is positioned from about 4 to 6 cm from the rectum vent.

Upon insertion, the intestinal fluids contact the plug causing it to swell, typically increasing the diameter of the plug from about 0.3 cm to about 2.25 cm. The swollen plug blocks the lumen of the distal colon, thus preventing the escape of fecal matter. Typical dimensions are set forth in the following table.

| Animal | Diameter (cm) | Length (cm) |
| --- | --- | --- |
| Chicken | .25–1.5 | 1–3 |
| Game Hen | .25–1.5 | 1–3 |
| Duck | .3–2 | 1–4 |
| Turkey | .3–2.25 | 1–5 |
| Cow | 10–15 | 13–20 |
| Sheep | 5–9 | 10–15 |
| Pig | 5–9 | 10–15 |

A determination of whether an effective seal has been formed can be pre-tested by manually squeezing the rectum of the animal being processed so that gasses or material contained therein press against the seal. By varying the squeeze pressure, one can qualitatively determine that the plug can withstand a considerable buildup of back pressure before becoming dislodged or before permitting leakage of fecal material from the vent.

Once the plug is inserted, the animal carcass continues along the processing line. After evisceration, the plug is discarded along with the intestine.

While the invention has been described in detail with reference to certain preferred embodiments thereof, it will be understood that modifications and variations are within the spirit and scope of that which is described and claimed.

That which is claimed is:

1. A method for processing a live animal to provide a meat food product comprising:

slaughtering an animal;

inserting a tampon-like plug into the rectum of the slaughtered animal, so that the distal end of the plug is positioned in the rectum spaced apart from the rectum vent;

causing the plug to come into contact with intestinal fluids after insertion into the rectum, to cause the plug to swell so as to conform to and form a seal with the rectal wall to obstruct the rectum and substantially prevent fecal leakage past the plug; and then eviscerating the animal.

2. The method in accordance with claim 1, wherein the animal is selected from cows, pigs, sheep and poultry.

3. The method in accordance with claim 1, wherein the animal is selected from chickens, game hens, ostriches, ducks and turkey.

4. The method in accordance with claim 1, wherein the animal is a turkey.

5. The method in accordance with claim 4, wherein after insertion the distal end of the plug is positioned from about 4 cm to about 6 cm from the rectum vent.

6. The method in accordance with claim 1, wherein the plug is cylindrical in shape.

7. A method for processing a live animal to provide a meat food product comprising:

slaughtering an animal selected from chickens, game hens, ostriches, ducks and turkeys;

inserting a cylindrical, tampon-like plug into the rectum of the slaughtered animal;

causing the plug to come into contact with intestinal fluids after insertion into the rectum, to cause the plug to swell to a width of from about 0.25 cm to about 2.25 cm and a length of from about 1 cm to about 5 cm and to conform to and form a seal with the rectal wall to obstruct the rectum and substantially prevent fecal leakage past the plug; and then eviscerating the animal.

8. The method in accordance with claim 4, wherein the plug is cylindrical in shape and upon swelling has a width of from about 0.3 cm to about 2.25 cm and a length of from about 1 cm to about 5 cm.

9. The method in accordance with claim 3, further comprising scalding, and de-feathering the slaughtered animal after inserting the plug.

10. A method for processing live poultry to provide a meat food product comprising:

slaughtering a poultry animal;

inserting a tampon-like plug into the rectum of the slaughtered poultry animal, so that the distal end of the plug is positioned from about 4 cm to about 6 cm from the rectum vent;

causing the plug to come into contact with intestinal fluids after insertion into the rectum, to cause the plug to swell and to obstruct the rectum and prevent fecal leakage past the plug;

scalding the slaughtered poultry animal;

de-feathering the scalded poultry animal; and then eviscerating the de-feathered poultry animal.

11. A pro-eviscerated animal comprising a slaughtered animal carcass having a tampon-like plug inserted into the rectum of the slaughtered animal, so that the distal end of the plug is positioned in the rectum end spaced apart from the rectum vent, the plug forming an obstruction in the rectum and substantially preventing fecal leakage past the plug.

12. The pre-eviscerated animal in accordance with claim 11, wherein the animal is selected from cows, pigs, sheep and poultry.

13. The pre-eviscerated animal in accordance with claim 11, wherein the animal is selected from chickens, game hens, ostriches, ducks and turkey.

14. The pre-eviscerated animal in accordance with claim 11, wherein the animal is a turkey.

15. The pre-eviscerated animal in accordance with claim 14, wherein the distal end of the plug is positioned from about 4 cm to about 6 cm from the rectum vent.

16. The pre-eviscerated animal in accordance with claim 1, wherein plug is cylindrical in shape.

17. A pre-eviscerated animal comprising a slaughtered chicken, game hen, ostrich, duck or turkey carcass having a cylindrical tampon-like plug inserted into the rectum of the slaughtered animal, the plug having a width of from about 0.25 cm to about 2.25 cm. and a length of from about 1 cm to about 5 cm forming an obstruction in the rectum and substantially preventing fecal leakage past the plug.

18. The pre-eviscerated animal in accordance with claim 14, wherein plug is cylindrical in shape and upon swelling has a width of from about 0.3 cm to about 2.25 cm and a length of from about 1 cm to about 5 cm.

* * * * *

UNITED STATES PATENT AND TRADEMARK OFFICE
CERTIFICATE OF CORRECTION

PATENT NO.   : 5,624,307
DATED        : April 29, 1997
INVENTOR(S)  : Ted Lenear and Jim C. Stockam It is certified that error appears in the above-indentified patent and that said Letters Patent is hereby corrected as shown below:

Claim 11, column 6, line 23, should be "pre-eviscerated" instead of "pro-eviscerated"

Claim 11, column 6, line 26, please change "end" to --and--.

Signed and Sealed this

Second Day of September, 1997

Attest:

BRUCE LEHMAN

Attesting Officer

Commissioner of Patents and Trademarks